Figure 1:
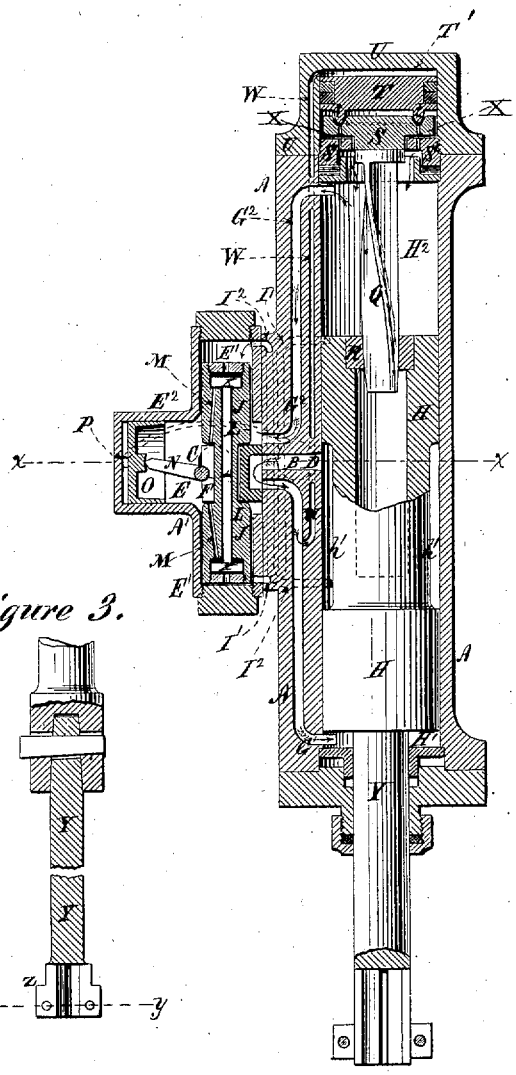

J. C. GITHENS.

Assignor to RAND DRILL Co.

Steam Rock Drill.

No. 9,529. Reissued Jan. 4, 1881.

Witnesses:

Geo. H. Mott

Edw. Payson

Inventor:

Joseph C. Githens.

Per Edw. E. Lump

Atty.

UNITED STATES PATENT OFFICE.

JOSEPH C. GITHENS, OF NEW YORK, N. Y., ASSIGNOR TO RAND DRILL COMPANY, OF SAME PLACE.

STEAM ROCK-DRILL.

~~SPECIFICATION forming part of Reissued Letters Patent No. 6,529, dated January 4, 1881.~~

Original No. 158,060, dated December 22, 1874. Application for reissue filed December 7, 1880.

*To all whom it may concern:*

Be it known that I, JOSEPH C. GITHENS, of the city, county, and State of New York, have invented a certain Improvement in Steam Rock-Drills, of which the following is a specification.

My improvement relates to the mechanism for imparting the intermittent rotating feed to a steam rock-drill; and my invention consists in the combination of a suitably-recessed drill-carrying piston with a centrally-placed spiral guide-rod engaged by a nut in the end of the piston, and an intermittently-acting clamp operated by steam-pressure to firmly hold the guide-rod stationary during the inward stroke of the piston, and thus force the piston, as it travels inward, to turn upon its longitudinal axis to an extent determined by the pitch of the spiral threads upon the guide-rod, the guide-rod being free from pressure during the outward stroke of the piston, and being thereby itself rotated upon its longitudinal axis by the outward movement of the piston until again clamped at the conclusion of the outward stroke in order to force the further rotation of the piston during its following inward stroke. Thus the spiral guide-rod and piston alternately subject each other to intermittent rotation upon their longitudinal axes in the same direction.

I provide for the application of steam-pressure to operate the guide-rod clamp by establishing in the bottom of the rock-drill cylinder a supplemental steam-chamber bounded upon its sides by the wall of the cylinder, and upon one end by the cap or head of the cylinder and at the other end by a movable wall or piston, which, when live-steam is introduced into the supplemental steam-chamber, is forced directly against the head of the spiral guide-rod, thus pressing the latter firmly against its seat upon an annular shoulder fixed upon the wall of the cylinder. The supplemental steam-chamber is supplied with steam through a steam-passage which communicates with the steam-passage for supplying steam to the steam-space at the outer end of the cylinder for the purpose of effecting the inward stroke of the piston. Thus, during the inward stroke of the piston the guide-rod is held stationary by the friction upon its head due to the pressure of the steam in the supplemental steam-chamber. At the conclusion of the inward stroke of the piston the steam admitted into the upper steam-space for the purpose of effecting the outward stroke of the piston makes its way through perforations in the head of the spiral guide-rod and in the shoulder upon which the head rests, and presses the clamp away from the head of the guide-rod, thus freeing the latter from pressure, so that it will itself be rotated by the outward motion of the piston. The exhaust-steam from the supplemental steam-chamber escapes with the exhaust-steam from the steam-space at the outer end of the cylinder.

One distinguishing peculiarity of my invention is that my mechanism for imparting the rotating feed is wholly contained within the interior of the cylinder and the recessed cap or head, which forms a continuation of the cylinder. Another is that the rotating feed is imparted without those shocks which are due to the percussive blows of the pawls used to drive the ratchet-wheels ordinarily employed to effect the rotating feed of the piston or rock-drill stock.

Figure 2:
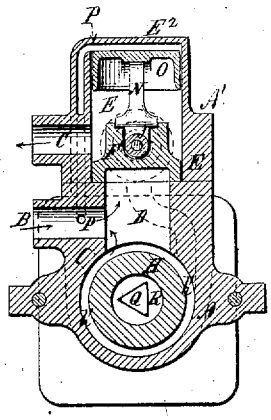
Figure 3:
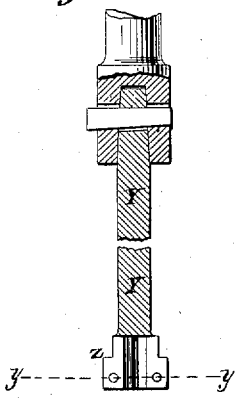
Figure 4:
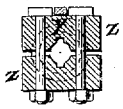

In the accompanying drawings, representing a steam rock-drill containing my improvement, Figure 1 is a central longitudinal section of the cylinder and valve-chest, showing the spiral guide-rod and a portion of the piston and piston-rod in elevation. Fig. 2 is a transverse section of the cylinder and valve-chest through the line *x x* on Fig. 1. Fig. 3 is a longitudinal section of the piston-rod, showing a method of detachably affixing it to the piston. Fig. 4 is a transverse section of the chuck upon the lower end of the piston-rod, taken through the line *y y* on Fig. 3.

The drawings represent a steam-cylinder, A, which is provided with a steam-inlet, B, and a valve-chest, A′, provided with a steam-outlet or exhaust-passage, C. The inlet-passage B leads into the port D, one end of which opens into the center of the cylinder A. The other end of the port D, which extends through the wall of the valve-chamber E, is always covered by the cavity of the valve F. The steam-passages G′ G², at their inner extremities, open into the cylinder A, near its ends. At their opposite extremities the passages G′ G² open into the valve-chamber E, and are alternately covered and uncovered by the cavity of the valve F. They thus act alternately as inlet and exhaust passages, discharging the exhaust-steam into the valve-chamber E, from which it escapes through the outlet C.

The piston H is a long cylinder, the middle portion of which is of less diameter than the ends, so that the space between the wall of the cylinder and the smaller portion of the piston forms an annular chamber, *h′*, which serves as the steam-chest. The smaller portion of the piston is made slightly longer than the length of the stroke of the piston, so that the annular steam-chest *h′* will always be in communication with the port D. Two other steam-passages, I′ I², open into the cylinder A at points so far on either side from the port D as to be alternately uncovered by the larger portions of the piston, so that they may alternately receive steam from the steam-chest *h′*. The steam which they thus receive is conducted, by the passages I′ I², alternately into the opposite cylindrical ends E′ of the valve-chamber E, which respectively contain the opposite ends or heads of the reciprocating piston J. The middle part of the piston J is of reduced diameter, and fits into a groove in the top of the valve F. The valve F being thus partially contained in a recess in the periphery of the piston J, is carried back and forth as the piston J reciprocates. By its movement in one direction the valve F uncovers the mouth of the steam-passage G′, allowing live-steam to flow from the port D through the cavity of the valve and the steam-passage G′ into the steam-space H′, beneath the piston H.

At the same time the exhaust-steam is allowed to escape from the steam-space H² above the piston, through the passage G², into the valve-chamber E, and thence into the outlet C. As the piston H in rising uncovers the mouth of the steam-passage I′, steam conducted through the passage I′ acts upon and drives the piston J, with the valve F, in the opposite direction, thus uncovering and admitting live-steam into the passage G² and allowing the exhaust-steam from the steam-space H′ to escape through the steam-passage G′, into the valve-chamber E, and thence through the outlet C.

The piston J is perforated longitudinally, and has small chambers formed in it near its ends, in which are placed the valves K, the stems L of which are respectively inserted in the opposite ends of the longitudinal perforation in the piston J; the inner ends of the stems meeting or abutting against each other. Both heads of the piston J are provided with the passages M, for allowing the escape into the valve-chamber E of the exhaust-steam from the chambers in the opposite ends of the piston J.

It will be seen that in operation live-steam, acting upon one end of the piston J, closes the valve K against the mouth of the exhaust-passage M at that end, and, by reason of the abutment of one valve-stem against the other, at the same time pushes the valve at the opposite end of the piston away from the mouth of its exhaust-passage, thus opening the path for the escape of the exhaust-steam from the end of the valve-chamber toward which the piston J is moving. The valve F is held down upon its seat by steam-pressure, and is thus prevented from jumping when being shifted. The mechanism by which this result is accomplished consists of a rocking arm, N, the cross-head of which is seated in notches in the top of the valve F. The opposite end of the arm N rests in a seat formed upon the center of a piston, O, which works in the cylindrical part E² of the valve-chamber E. The piston O is kept under constant pressure by steam introduced behind it through the passage P, which communicates with the steam-inlet B, as shown in Figs. 1 and 2.

The piston H is centrally recessed at its upper end to admit the twisted or spiral guide-rod Q.

The guide-rod Q, which may be made triangular or of other form in cross-section, is engaged by a suitably-shaped nut, R, inserted in the end of the piston H at the mouth of the recess, which admits the end of the guide-rod. The guide-rod is provided upon its upper end with a disk-shaped head, S, which is seated upon an annular shoulder, S′, and is firmly held thereon by the piston or clamp T when live-steam is introduced into the supplemental steam-chamber T′.

For convenience I employ, in place of the ordinary cylinder-head, the recessed cap U, to close the upper end of the cylinder A. The recess in the cap U is of the same diameter as the interior of the cylinder A, and may be considered a part thereof.

The piston T is packed upon its periphery to make a steam-tight joint with the wall of the cylinder. This piston is my clamp for holding the guide-rod stationary, and to add to the effectiveness of its action in that capacity I provide it upon its under side with the annular rib *t′*, which is wedge-shaped in cross-section, and which enters a similarly-shaped annular groove in the top of the disk S.

Live-steam is supplied to the supplemental steam-chamber T′ from the mouth of the passage W, which, at its opposite end, opens into the steam-passage G′. When, therefore, live-steam is introduced into the steam-space H′ to drive the piston H inward, it is conducted by the passage W into the supplemental steam-chamber T′, where it acts upon the clamp T, forcing the clamp against the head of the guide-rod with such friction that the guide-rod is held stationary during the inward stroke of the piston. The piston, by reason of the engagement of its nut R with the spiral guide-rod, is thus compelled to turn upon its longitudinal axis as it travels inward, the extent to which it turns being, as will be seen, determined by the pitch of the spiral thread or spiral path, over which the nut R travels. During the outward stroke of the drill-piston steam is simultaneously exhausted from the steam-space H′ and the supplemental steam-chamber T′, and the clamp T is forced away from the head S of the guide-rod by the pressure of the live-steam in the steam-space $H^2$. The guide-rod is thus relieved from the friction upon its head, and, by reason of its engagement with the nut R, is rotated upon its longitudinal axis as the piston H travels outward, thus acquiring the proper position to react in its turn upon the drill-piston when the steam-clamp is again applied.

The piston-rod Y may be formed solid with the piston H, as shown in Fig. 1, or it may be detachable, and secured in the piston H by a wedge or draw-key, as shown in Fig. 3. The latter construction I prefer, as it enables the lower end of the piston-rod Y to be made larger at its lower end, where it first fails, and also enables the chuck Z to be made a solid part of the said rod, as shown in Figs. 3 and 4.

I claim as my invention—

1. In a steam rock-drill, the combination of the guide-rod Q with the clamp T and the supplemental steam-chamber T′, into which steam is admitted during the downward stroke of the main piston, substantially as and for the purpose set forth.

2. The projecting rib *t* upon the under side of the clamp T, in combination with the corresponding groove in the upper side of the head S of the guide-rod, substantially as and for the purpose set forth.

3. The combination of the cylinder A and the drill-piston H with the guide-rod Q, the shoulder S′, for the support of the head S of the guide-rod, the clamp T, the supplemental steam-chamber T′, and steam-passages and valve-gear, substantially such as described, arranged to at one time simultaneously supply steam to the steam-space H′ and the supplemental steam-chamber T′ and discharge exhaust-steam from the steam-space $H^2$, and at another time to simultaneously supply steam to the steam-space $H^2$ and discharge exhaust-steam from the steam-space H′ and the supplemental steam-chamber T′, substantially as and for the purposes set forth.

JOSEPH C. GITHENS.

Witnesses:
S. M. OSGOOD,
M. L. ADAMS.